(12) United States Patent
Yourdkhani

(10) Patent No.: US 12,220,864 B2
(45) Date of Patent: Feb. 11, 2025

(54) SELF-HEATING TOOLING DEVICE FOR CURING OF COMPOSITES

(71) Applicant: Colorado State University Research Foundation, Fort Collins, CO (US)

(72) Inventor: Mostafa Yourdkhani, Fort Collins, CO (US)

(73) Assignee: Colorado State University Research Foundation, Fort Collins, CO (US)

(*) Notice: Subject to any disclaimer, the term of this patent is extended or adjusted under 35 U.S.C. 154(b) by 0 days.

(21) Appl. No.: 17/702,209

(22) Filed: Mar. 23, 2022

(65) Prior Publication Data
US 2022/0305727 A1    Sep. 29, 2022

Related U.S. Application Data

(60) Provisional application No. 63/164,754, filed on Mar. 23, 2021.

(51) Int. Cl.
*B33Y 10/00*    (2015.01)
*B29C 64/165*   (2017.01)
(Continued)

(52) U.S. Cl.
CPC .......... *B29C 64/165* (2017.08); *B29C 64/245* (2017.08); *B29C 64/295* (2017.08);
(Continued)

(58) Field of Classification Search
CPC .......... B29K 2105/162; B29K 2507/04; B29K 2995/0005; B33Y 80/00; H05B 2214/04; B29C 64/118
See application file for complete search history.

(56) References Cited

U.S. PATENT DOCUMENTS

2016/0299424 A1* 10/2016 Chouiki ................... B41K 3/36
2017/0176853 A1*  6/2017 Cheng ................... B29C 59/022
2019/0337220 A1* 11/2019 Beyerle ................ H01Q 17/002
2019/0344494 A1* 11/2019 Cropper ................. B32B 7/025

FOREIGN PATENT DOCUMENTS

WO    WO-2019210976 A1 * 11/2019 ........... B29C 59/022

OTHER PUBLICATIONS

O'Neill, New Study on the Space Durability of 3D-Printed Nanocomposites, ISS National Lab, https://www.issnationallab.org/uiuc-durability-3d-printed-nanocomposites-misse/ Accessed Feb. 27, 2023 (Year: 2020).*

(Continued)

*Primary Examiner* — Cedrick S Williams
*Assistant Examiner* — Erica Hartsell Funk
(74) *Attorney, Agent, or Firm* — Robinson IP Law, PLLC

(57) ABSTRACT

Various implementations include a self-heating device. The device includes an electrically insulative layer, an electrically conductive layer, a first electrode, and a second electrode. The electrically insulative layer has a first surface and a second surface spaced apart from the first surface. The electrically conductive layer has a first surface and a second surface spaced apart from the first surface. The second surface of the conductive layer is coupled to the first surface of the insulative layer. The conductive layer includes a polymer. Conductive nanoparticles are embedded in the polymer. The first electrode and a second electrode are coupled to the conductive layer. The first electrode and the second electrode are spaced apart from each other and in electrical communication with each other through the conductive layer. The conductive layer produces heat through Joule heating when electrical current is passed through the conductive layer.

25 Claims, 5 Drawing Sheets

(51) Int. Cl.
| | |
|---|---|
| *B29C 64/245* | (2017.01) |
| *B29C 64/295* | (2017.01) |
| *B33Y 30/00* | (2015.01) |
| *B33Y 70/10* | (2020.01) |
| *B29K 23/00* | (2006.01) |
| *B29K 105/16* | (2006.01) |
| *B29K 507/04* | (2006.01) |

(52) U.S. Cl.
CPC ............... *B33Y 10/00* (2014.12); *B33Y 30/00* (2014.12); *B33Y 70/10* (2020.01); *B29K 2023/38* (2013.01); *B29K 2105/162* (2013.01); *B29K 2507/04* (2013.01); *B29K 2995/0005* (2013.01); *B29K 2995/0007* (2013.01)

(56) References Cited

OTHER PUBLICATIONS

Jang SH, Kim D, Park YL. Accelerated Curing and Enhanced Material Properties of Conductive Polymer Nanocomposites by Joule Heating. Materials (Basel). Sep. 19, 2018;11(9):1775. doi: 10.3390/ma11091775. PMID: 30235801; PMCID: PMC6165553. (Year: 2018).*

Bartolomé Mas, Thermoset curing through Joule heating of nanocarbons for composite manufacture, repair and soldering, Carbon vol. 63, Nov. 2013, pp. 523-529 (Year: 2013).*

Helge Kristiansen, Overview of Conductive Adhesive Interconnection Technologies for LCD's, IEEE Transactions On Components, Packaging, and Manufacturing Technology-Part A, vol. 21, No. 2, Jun. 1998 (Year: 1998).*

* cited by examiner

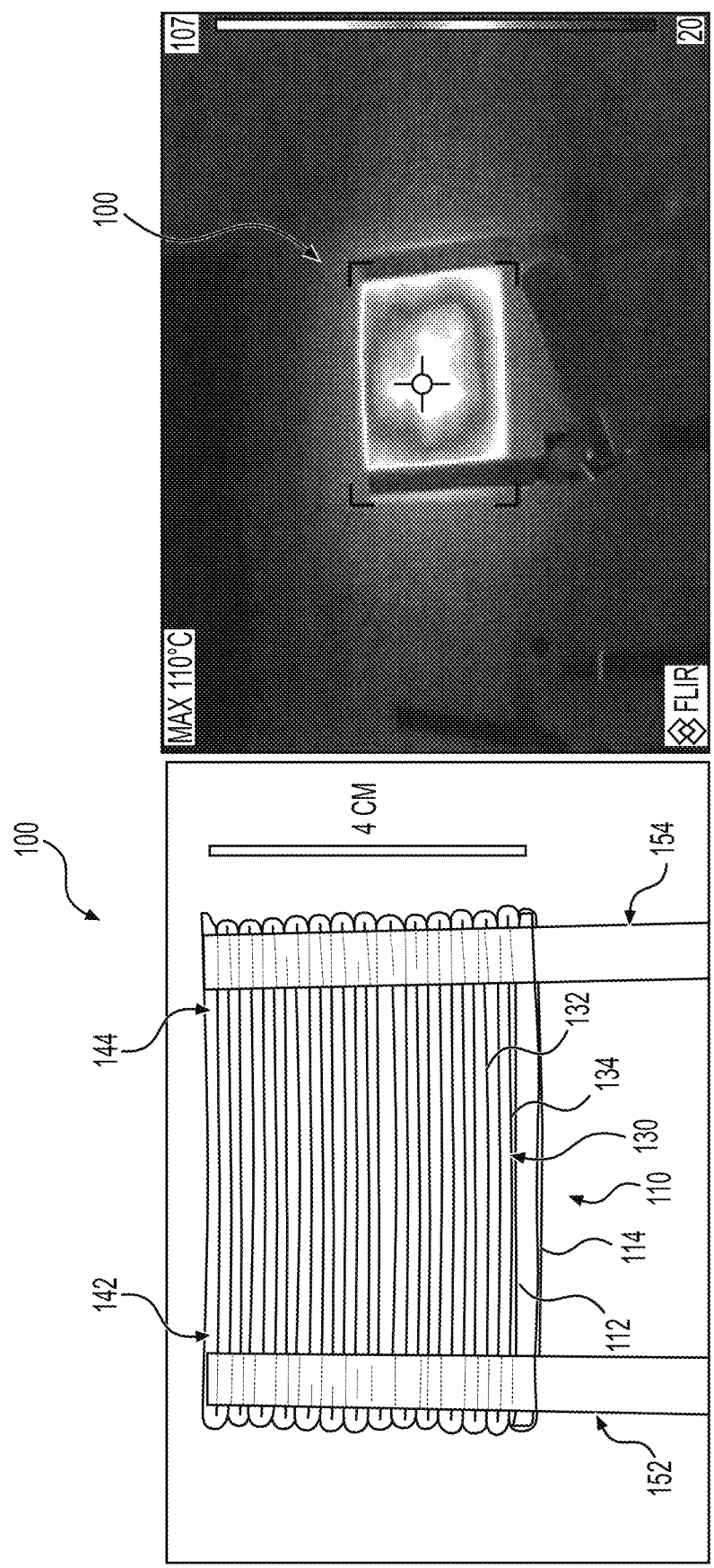

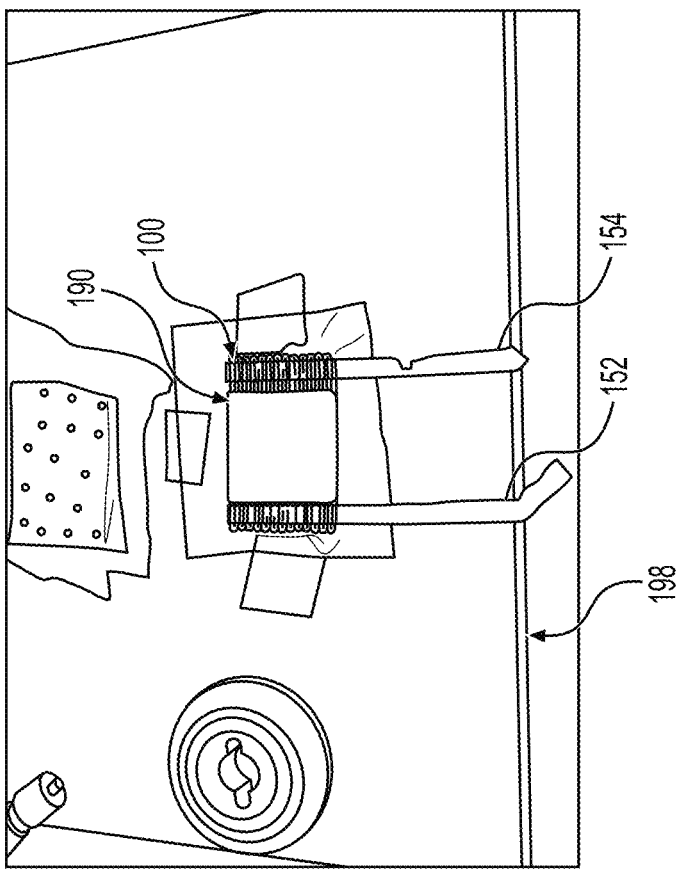
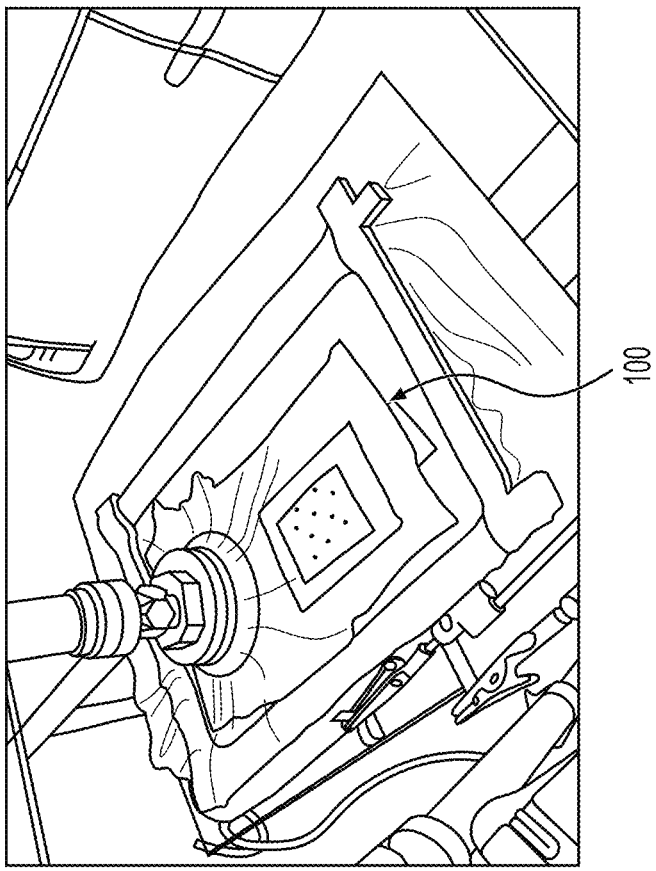
FIG. 5A
FIG. 5B

SELF-HEATING TOOLING DEVICE FOR CURING OF COMPOSITES

CROSS-REFERENCE TO RELATED APPLICATIONS

This application claims the benefit of U.S. Provisional Patent Application No. 63/164,754, filed Mar. 23, 2021, the contents of which are incorporated herein by reference in their entirety.

BACKGROUND

Fiber-reinforced polymer composites (FRPCs) are integral to aerospace, automotive, marine, biomedical, sports, construction, and energy industries owing to their excellent mechanical properties and low density. Conventional manufacture of FRPC components requires the matrix thermoset resin to be polymerized (cured) at elevated temperatures for several hours using large autoclaves or ovens that scale in size with the component. The traditional manufacturing approach is therefore energy-inefficient and involves significant capital investment (e.g., access to large autoclaves and ovens).

The manufacture of FRPC structures with non-planar geometries is particularly challenging because detailed mold and process design are often required for every new design, leading to long lead times and high manufacturing cost. Recently, additive manufacturing techniques, which offer flexible and customizable design of 3D objects, have been used to make tooling for composite manufacturing. However, the materials used in tooling development typically have low thermal stability, making them unsuitable for high temperature curing of composites. Most additively manufactured tooling or molds are therefore suitable for room-temperature curing of composites. Even if the additively manufactured tooling can be used in processing of composites at temperatures higher than room temperature, the tooling with the composite layup still should not be placed inside ovens or autoclaves for composite curing, restricting the size of parts that can be manufactured and leading to high cost of manufacturing and infrastructure.

Thus, there is a need for tooling that can be used in curing FRPC structures without the need for placing the tooling in an autoclave.

SUMMARY

Various implementations include a self-heating device. The device includes an electrically insulative layer, an electrically conductive layer, a first electrode, and a second electrode. The electrically insulative layer has a first surface and a second surface spaced apart from the first surface. The electrically conductive layer has a first surface and a second surface spaced apart from the first surface. The second surface of the conductive layer is coupled to the first surface of the insulative layer. The conductive layer includes a polymer. Conductive nanoparticles are embedded in the polymer. The first electrode and a second electrode are coupled to the conductive layer. The first electrode and the second electrode are spaced apart from each other and in electrical communication with each other through the conductive layer. The conductive layer produces heat through Joule heating when electrical current is passed through the conductive layer.

In some implementations, the nanoparticles include carbon. In some implementations, the nanoparticles include nanotubes. In some implementations, the nanoparticles include graphene. In some implementations, the nanoparticles include nanofibers. In some implementations, the nanoparticles include carbon black.

In some implementations, the polymer is dicyclopentadiene (DCPD).

In some implementations, the polymer including the conductive layer is a first polymer, and the insulative layer includes a second polymer. In some implementations, the first polymer and the second polymer are the same material.

In some implementations, the first surface of the conductive material defines a contoured shape.

In some implementations, the insulative layer is a first insulative layer, and the device further includes a second insulative layer coupled to first surface of the conductive layer.

Various other implementations include a method of manufacturing a self-heating device. The method includes providing an electrically insulative layer as described above; disposing an electrically conductive layer onto the insulative layer as described above, wherein the conductive layer produces heat through Joule heating when electrical current is passed through the conductive layer; coupling a first electrode and a second electrode to the conductive layer as described above; and causing the conductive layer to cure.

In some implementations, the method further includes providing a build plate, and the insulative layer is disposed onto the build plate. In some implementations, the insulative layer is disposed onto the build plate by additive manufacturing.

In some implementations, the conductive layer is disposed onto the insulative layer by additive manufacturing.

In some implementations, the polymer includes the conductive layer is a first polymer, and the insulative layer includes a second polymer. The method further includes causing the insulative layer to cure. In some implementations, the first polymer and the second polymer are the same material. In some implementations, the insulative layer is caused to cure before the conductive layer is disposed onto the insulative layer.

In some implementations, the first electrode and the second electrode are coupled to the conductive layer after the conductive layer is caused to cure.

In some implementations, the nanoparticles include carbon. In some implementations, the nanoparticles include nanotubes. In some implementations, the nanoparticles include graphene. In some implementations, the nanoparticles include nanofibers. In some implementations, the nanoparticles include carbon black.

In some implementations, the polymer is dicyclopentadiene (DCPD).

In some implementations, the first surface of the conductive material defines a contoured shape.

In some implementations, the insulative layer is a first insulative layer, and the method further includes disposing a second insulative layer onto the conductive layer such that the second insulative layer is coupled to the first surface of the conductive layer. In some implementations, the second insulative layer is disposed onto the conductive layer by additive manufacturing.

Various other implementations include a method of manufacturing a polymer part using a self-heating tooling device. The method includes providing a self-heating tooling device, as described above; disposing a layer of resin onto the device and adjacent the first surface of the conductive layer such that the layer of resin is in thermal communication with the conductive layer; and causing electrical current to flow through the conductive layer to produce heat through Joule heating to cause the layer of resin cure into a polymer part.

In some implementations, the layer of resin further includes fibers and the polymer part is a fiber-reinforced polymer composite.

In some implementations, disposing a layer of resin includes additive manufacturing. In some implementations, the resin further includes fibers.

In some implementations, the nanoparticles include carbon. In some implementations, the nanoparticles include nanotubes. In some implementations, the nanoparticles include graphene. In some implementations, the nanoparticles include nanofibers. In some implementations, the nanoparticles include carbon black.

In some implementations, the polymer is dicyclopentadiene (DCPD).

In some implementations, the polymer includes the conductive layer is a first polymer, and the insulative layer includes a second polymer. In some implementations, the first polymer and the second polymer are the same material.

In some implementations, the first surface of the conductive material defines a contoured shape.

In some implementations, the layer of resin is disposed onto the first surface of the conductive layer.

In some implementations, the insulative layer is a first insulative layer, and the device further includes a second insulative layer coupled to first surface of the conductive layer. The layer of resin is disposed onto the second insulative layer.

BRIEF DESCRIPTION OF THE DRAWINGS

Example features and implementations are disclosed in the accompanying drawings. However, the present disclosure is not limited to the precise arrangements and instrumentalities shown.

FIG. 1A shows a perspective view of a self-heating device, according to one implementation.

FIG. 1B shows a thermal image of the device of FIG. 1A being heated through Joule heating.

FIGS. 5A and 5B show perspective views of the device of FIG. 1A being used as tooling to manufacture a polymer composite part.

DETAILED DESCRIPTION

Figure 2B:
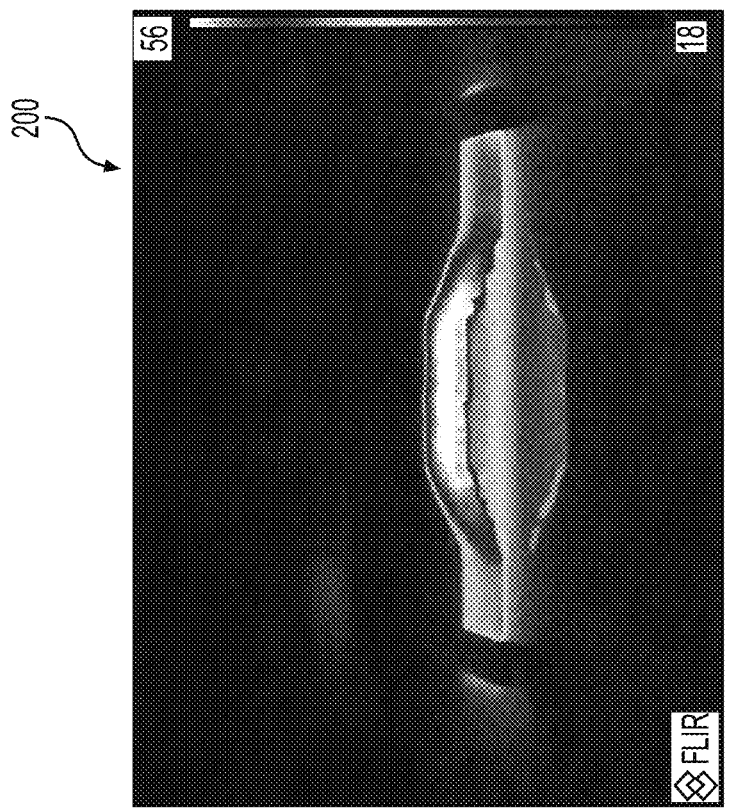
FIG. 2B shows a thermal image of the device of FIG. 2A being heated through Joule heating.

The devices, systems, and methods disclosed herein provide for curing of composites without the need for an autoclave. The devices include a conductive layer that can be formed through additive manufacturing. When electrical current is passed through the conductive layer, the conductive layer "self-heats" by Joule heating to cause the resin of a composite placed on the conductive layer to cure. Because the device itself creates enough heat to cure the composite, the uncured composite and the tooling device do not need to be placed in an autoclave for curing.

The devices have a high glass transition temperature (Tg) for high-temperature curing of composites. This new tooling design offers rapid and flexible design and manufacturing of high-performance tooling, eliminates the need for expensive resources (i.e., ovens and autoclaves), and can make composite manufacturing more accessible, energy-efficient, and cost-effective.

The devices, systems, and methods disclosed herein include conductive nanoparticles (e.g., carbon nanotubes, carbon nanofibers, graphene, carbon black, carbon nanofibers, etc.) mixed with polymers to enhance their electrical conductivity and create printable conductive polymers that can conduct electrical current and produce heat by Joule heating (i.e., resistive heating) effect. Using a multimaterial design approach, where the conductive polymer is printed on a non-conductive 3D-printed polymer substrate, allows for preventing any current loss and minimizing heat losses from the tooling to the surfaces under the tooling.

Both thermoset and thermoplastic polymer materials with a high temperature stability (including but not limited to epoxies, polyurethanes, cyclic olefins, acrylates, PEEK, PEKK, polyimidies, PPS, PES) can be used in the design of self-heated tooling using the methods disclosed herein. Flash-curable, high-performance thermosetting resin system based on dicyclopentadiene (DCPD) and epoxies can be used to develop printable inks by modifying the base resin system with electrically conductive and non-conductive particles. This novel resin system can instantaneously polymerize and cure printed materials following deposition from the printing nozzle without an additional post-curing step. The inks can therefore be used to produce various tooling geometry without additional support materials (i.e., in-the-air printing) for curing fiber-reinforced polymer composites based on the integrated self-heating capability.

The tooling design comprises two main material systems, namely, electrically conductive, self-heating surface layer(s) and a non-conductive host material. The non-conductive layering is the base of the tooling to electrically isolate and protect the electrically conductive layer, which becomes the heating element. Both inks utilize the same matrix resin (e.g., DCPD) to minimize the difference in thermal expansion and to improve the interlaminar properties of printed tooling. Carbon nanotubes can be used in the conductive ink as a conductive nanoparticle and rheology modifier whereas fumed silica can be used in the non-conductive material as a rheology modifier (though other combinations of materials are envisioned). Upon printing and curing of the inks, the resulting polymeric materials have a high glass transition temperature, $T_g$, of ~120° C., making the printed tooling suitable for curing composites at cure temperatures up to 100° C.

The self-heated tooling can be used to demonstrate out-of-oven curing of conventional composite materials using prepregs (i.e., pre-impregnated fabrics) or resin film infusion processing techniques. The self-heated tooling heats the composite layup directly via conduction as opposed to conventional convective heat transfer mechanisms, leading to energy-efficient curing of composites. In addition, this process is scalable and can be developed using inexpensive printers and a wide range of materials.

In addition to the demonstrated tooling design, this printing technique can be used to directly write/print functional materials (using various polymers, additives, particles, reinforcements, optical fibers) on exiting surfaces or printed structures for imparting multifunctional properties (including but not limited to electrical, electrothermal, electromagnetic shielding, piezoelectricity, structural health monitoring, and energy storage) to polymeric parts for use in various applications, including de-icing, wearable heaters, self-healing, shape memory polymers, and sensors.

Various implementations include a self-heating device. The device includes an electrically insulative layer, an electrically conductive layer, a first electrode, and a second electrode. The electrically insulative layer has a first surface and a second surface spaced apart from the first surface. The electrically conductive layer has a first surface and a second surface spaced apart from the first surface. The second surface of the conductive layer is coupled to the first surface of the insulative layer. The conductive layer includes a polymer. Conductive nanoparticles are embedded in the polymer. The first electrode and a second electrode are coupled to the conductive layer. The first electrode and the second electrode are spaced apart from each other and in electrical communication with each other through the conductive layer. The conductive layer produces heat through Joule heating when electrical current is passed through the conductive layer.

Various other implementations include a method of manufacturing a self-heating device. The method includes providing an electrically insulative layer as described above; disposing an electrically conductive layer onto the insulative layer as described above, wherein the conductive layer produces heat through Joule heating when electrical current is passed through the conductive layer; coupling a first electrode and a second electrode to the conductive layer as described above; and causing the conductive layer to cure.

Various other implementations include a method of manufacturing a polymer part using a self-heating tooling device. The method includes providing a self-heating tooling device, as described above; disposing a layer of resin onto the device and adjacent the first surface of the conductive layer such that the layer of resin is in thermal communication with the conductive layer; and causing electrical current to flow through the conductive layer to produce heat through Joule heating to cause the layer of resin cure into a polymer part.

Figure 2A:
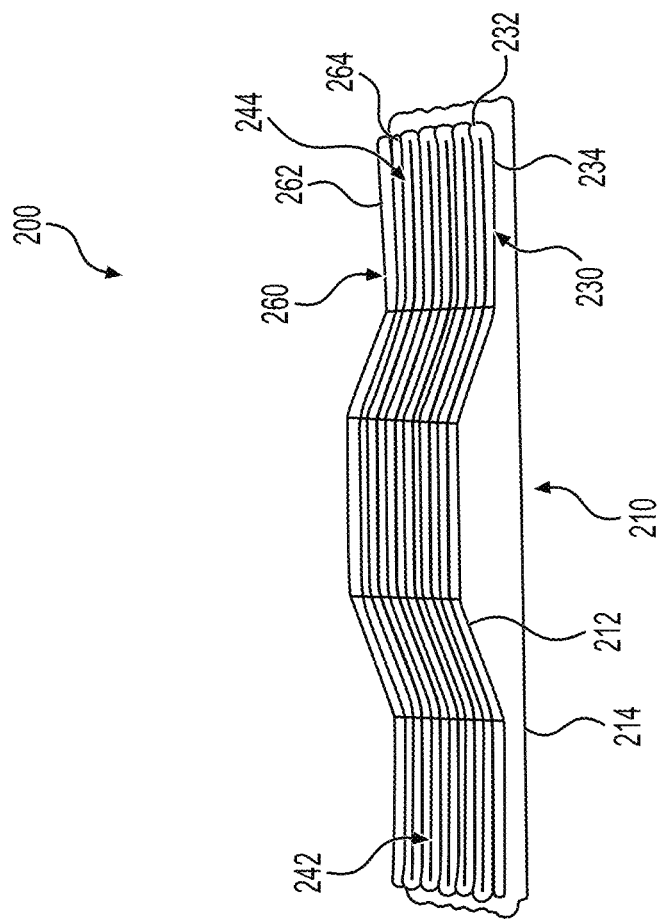
FIG. 2A shows a perspective view of a self-heating device, according to another implementation.
Figure 3:
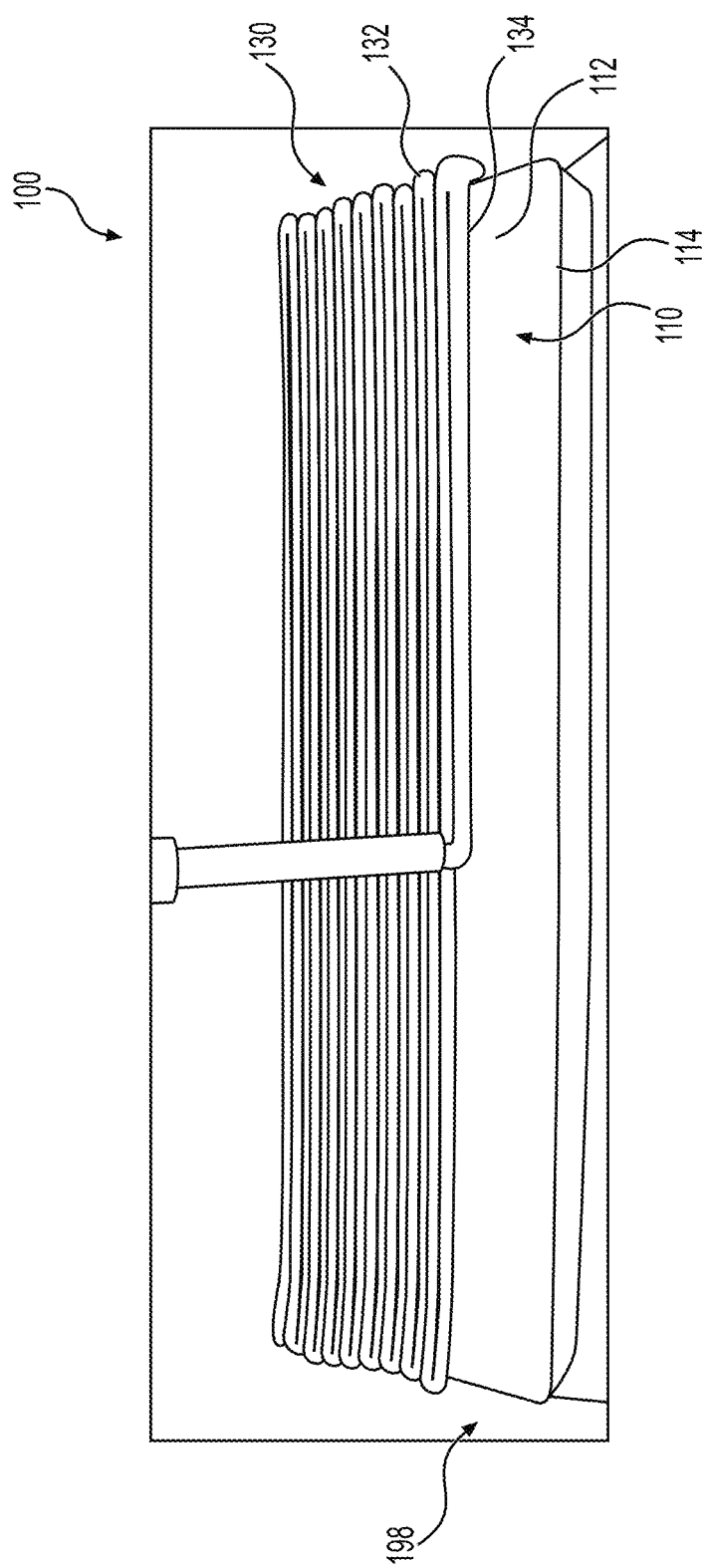
FIG. 3 shows a perspective view of the device of FIG. 1A being made using additive manufacturing.

FIGS. 1-3 show self-heating tooling devices 100, 200, according to various aspects of some implementations. The devices 100, 200 each include a first electrically insulative layer 110, 210 and an electrically conductive layer 130, 230. The device 200 shown in FIGS. 2A and 2B further includes a second electrically insulative layer 260 but is shown prior to coupling electrodes to the device 200, and the device 100 in FIGS. 1A and 1B is shown with a first electrode 152, a second electrode 154 but does not include a second insulative layer.

The first insulative layer 110, 210 of the devices 100, 200 shown in FIGS. 1A-2B have a first surface 112, 212 and a second surface 114, 214 spaced apart from the first surface 112, 212. The first insulative layers 110, 210 shown in FIGS. 1A-2B are made of dicyclopentadiene (DCPD) and have been created using additive manufacturing, as shown in FIG. 3. The first insulative layer 110 shown in FIGS. 1A and 1B is formed such that the first surface 112 defines a flat surface, however in implementations, such as the device shown in FIGS. 2A and 2B, the first insulative layer 210 of the device 200 is formed such that the first surface 212 defines a contour. This contoured shape defines the shape of the conductive layer 230, and thus, the shape of the tooling device 200 and the at least the shape of the bottom surface of the part manufactured using the device 200.

In some implementations, the first insulative layer is not created using additive manufacturing and is created using any other known technique of forming an electrically insulative part. In some implementations, the contour of the first surface of the first insulative layer is any other desired shape such that the device can be used to manufacture any other shape of a bottom surface of a part. In some implementations, the first surface of the first insulative layer does not define a contour and is flat. In some implementations, the first insulative layer is an electrically insulative surface and is not specifically manufactured for the device.

The electrically conductive layers 130, 230 shown in FIGS. 1A-2B have a first surface 132, 232 and a second surface 134, 234 spaced apart from the first surface 132, 232. The second surface 134, 234 of the conductive layer 130, 230 is coupled to the first surface 112, 212 of the first insulative layer 110, 210, as shown in FIGS. 1A-2B. The first surface 132, 232 of the conductive layer 130, 230 has a first portion 142, 242 and a second portion 144, 244 spaced apart from the first portion 142, 242.

Referring again to FIGS. 2A and 2B, because the second surface 234 of the conductive layer 230 is coupled to the contoured first surface 212 of the first insulative layer 210, the first surface 232 of the conductive material 230 also defines a contoured shape. However, in implementations such as the device 100 shown in FIGS. 1A and 1B, the first insulative layer 110 does not include a contoured surface, and the first surface 132 of the conductive layer 130 includes a flat surface. In some implementations, the first insulative layer does not include a contoured surface, but the conductive layer has a variable thickness such that the first surface of the conductive layer includes a contoured surface. In some implementations, neither the first insulative layer nor the conductive layer include a contoured surface.

Like the first insulative layers 110, 210 shown in FIGS. 1A-2B, the conductive layers 130, 230 also include DCPD. However, the conductive layers 130, 230 also include conductive nanoparticles embedded within the DCPD. The nanoparticles embedded within the DCPD of the conductive layers 130, 230 shown in FIGS. 1A-2B are carbon nanoparticles, but in other implementations, the conductive nano particles can include graphene, carbon black, carbon nanotube, carbon nanofiber, graphite, silver nanoparticles, copper nanoparticles, or any other electrically conductive material capable of being embedded within the polymer of the conductive layer and forming a continuously electrically conductive circuit through the conductive layer. In some implementations, the nanoparticles include nanotubes, nanofibers, or any other shape nanoparticles capable of being embedded within the polymer of the conductive layer and forming a continuously electrically conductive circuit through the conductive layer.

Making the first insulative layer 110, 210 and conductive layer 130, 230 of FIGS. 1A-2B out of the same material minimizes thermal expansion during use. Although the first insulative layers 110, 210 and conductive layers 130, 230 shown in FIGS. 1A-2B both include DCPD, in other implementations, one or both of the first insulative layer and conductive layer can include any other polymer, such as a thermosets (e.g., epoxies, vinyl esters, phenolics, acrylates, polyimides, or a hybrid thereof) and/or a thermoplastic (e.g., PEEK, PEKK, PES, PBS, PLA, Nylon, PET, PETG, ABS). In some implementations, one or both of the first insulative layer and conductive layer include any other material suitable for making a tooling device.

The first electrode 152 shown in FIGS. 1A and 1B is coupled to the first portion 142 of the first surface 132 of the conductive layer 130, and the second electrode 154 is coupled to the second portion 144 of the first surface 132 of the conductive layer 130. Because the conductive layer 130 is electrically conductive, the first electrode 152 is in electrical communication with the second electrode 154 through the conductive layer 130. When electrical current is passed through the conductive layer 130, the resistance of the conductive layer 130 causes the conductive layer 130 to produce heat through Joule heating.

As discussed above, the device 200 shown in FIGS. 2A and 2B includes a second insulative layer 260 that has a first surface 262 and a second surface 264 spaced apart from the first surface 262. The second surface 264 of the second insulative layer 260 abuts the first surface 232 of the conductive layer 230, as shown in FIGS. 2A and 2B. Although the second insulative layer 260 provides an electrical insulation barrier between the conductive layer 230 and the manufactured part being formed on the tooling device 200, heat can still transfer through the second insulative layer 260. The second insulative layer 260 can also prevent sticking of the manufactured part being formed and the conductive layer 230.

In some implementations, the device does not include a second insulative layer. In some implementations, the second insulative layer is separate from the device, such as a sheet of electrically non-conductive polymer, as shown in FIGS. 5A and 5B.

FIG. 3 shows the manufacturing of the device 100 of FIGS. 1A and 1B. To manufacture the self-heating device 100 of FIGS. 1A and 1B described above, an electrically insulative layer 110 is disposed on a build plate 198 such that the second surface 114 of the first insulative layer 112 abuts the build plate and the first surface 112 of the first insulative layer 110 faces away from the build plate. The first insulative layer 110 is then caused to cure.

Next the electrically conductive layer 130 is disposed onto the insulative layer 110 such that the second surface 134 of the conductive layer 130 is coupled to the first surface 112 of the first insulative layer 110 and the first surface 132 of the conductive layer 130 faces away from the first insulative layer 110. As discussed above, the conductive layer 130 includes a polymer that has conductive nanoparticles embedded in the polymer.

A first electrode 152 is then coupled to the first portion 142 of the conductive layer 130 and a second electrode 154 is coupled to the second portion 144 of the conductive layer 130 such that the first electrode 152 and the second electrode 154 are spaced apart from each other and in electrical communication with each other through the conductive layer. The conductive layer 130 is then caused to cure.

A second insulative layer can then be optionally added such that the second surface of the second insulative layer is coupled to the first surface of the conductive layer and the first surface of the second insulative layer faces away from the conductive layer. The second insulative layer is then caused to cure.

In the method discussed above, the first insulative layer 110, the conductive layer 130, and the second insulative layer are each manufactured by additive manufacturing, as shown in FIG. 3. However, in other implementations, one or more of the first insulative layer, the conductive layer, and the second insulative layer are manufactured by any other known method of forming a polymer.

In some implementations, a first insulative layer is not deposited on a build plate, and the conduct is disposed directly onto any other insulative surface. In some implementations, the first insulative layer, or conductive layer where a first insulative layer is not included, is not disposed onto a build plate.

Although the first insulative layer 110 in the method above is caused to cure prior to the conductive layer 130 being disposed on the first insulative layer 110, in some implementations, the conductive layer is disposed on the first insulative layer prior to causing the first insulative layer to cure, and then both the first insulative layer and the conductive layer are caused to cure at the same time. Although the first electrode 152 and the second electrode 154 in the method above are coupled to the conductive layer 130 prior the conductive layer 130 being caused to cure, in some implementations, the first electrode and the second electrode are coupled to the conductive layer after the conductive layer is caused to cure.

Figure 4:
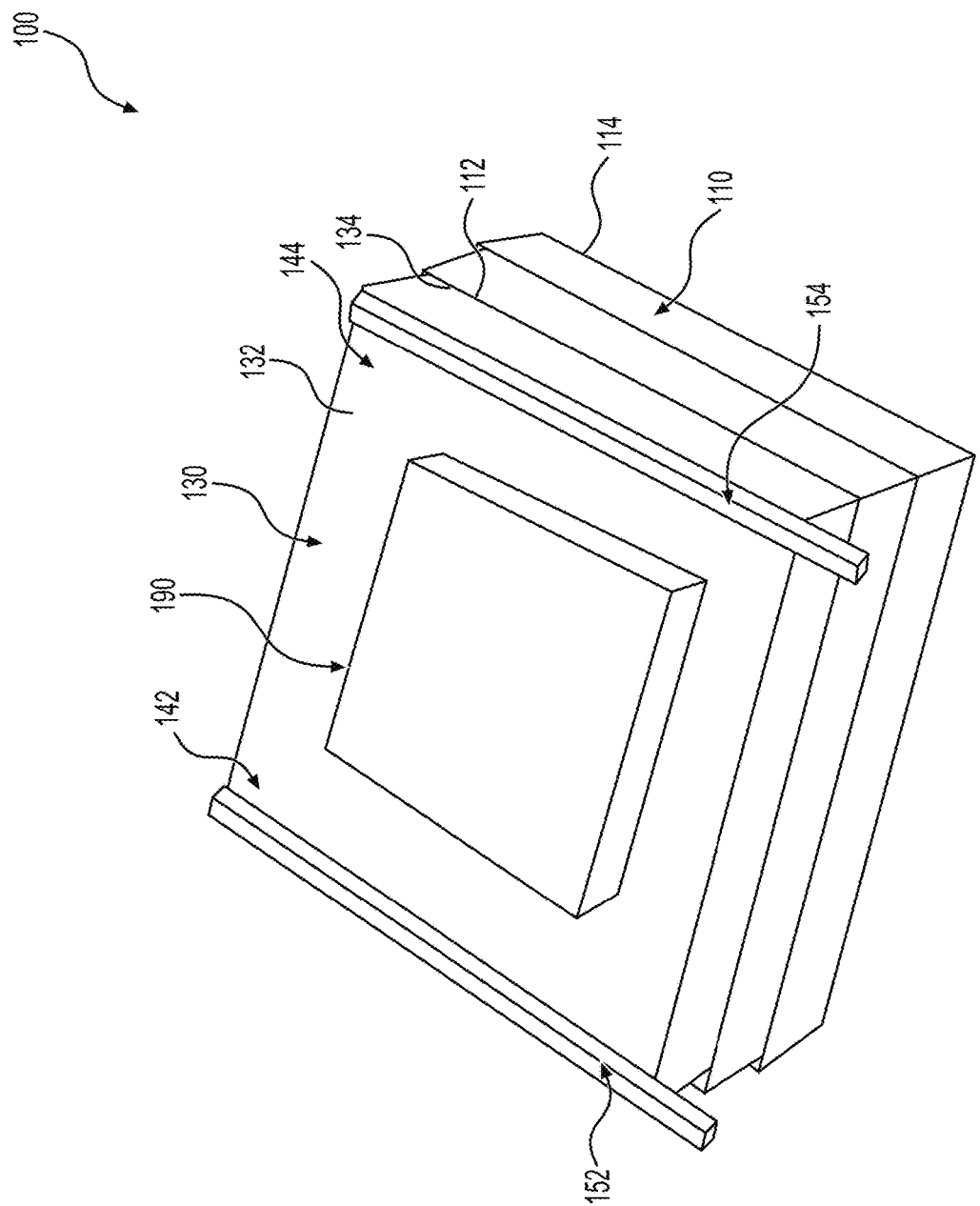
FIG. 4 shows a perspective view of the device of FIG. 1A with a composite resin disposed on the device.

FIGS. 4-5B show the device of FIGS. 1A and 1B in use. To use the self-heating device 100 described above as tooling to manufacture a polymer part 190, composite resin 190 is disposed onto the device 100 and adjacent the first surface 132 of the conductive layer 130 such that the composite resin 190 is in thermal communication with the conductive layer 130. If the device 200 includes a second insulative layer 260, such as the device 200 shown in FIGS. 2A and 2B, the composite resin is disposed directly onto the second insulative layer 260. However, for implementations like the device 100 shown in FIGS. 1A and 1B in which the device 100 does not include a second insulative layer, the composite resin 190 is disposed directly onto the first surface 132 of the conductive layer 130. The tooling and composite resin 190 can be optionally placed within a flexible, vacuum sealed compartment, as shown in FIG. 5A, to urge the composite resin 190 to conform the shape of the first surface 132 of the conductive layer 130.

As shown in FIG. 5B, the first electrode 152 and the second electrode 154 are coupled to an electricity source 192 such that the first electrode 152 and the second electrode 154 are in electrical communication through the conductive layer 130. Electrical current is then caused to flow from the first electrode 152, through the conductive layer 130, and to the second electrode 154 to cause the conductive layer 130 to produce heat through Joule heating to cause the composite resin 190 cure into a polymer composite part 190. FIGS. 1B and 2B show thermal images of each device 100, 200 being heated to cure a composite resin 190 to form a part. FIG. 5B shows the composite part 190 after the resin has cured.

Although the above implementation of the device 100 is used as tooling for manufacturing of polymer parts, in some implementations, the devices disclosed herein can be used for any other purpose, such as in heat exchangers where controlled flow of heat is desired.

Examples

For proof of concept, a flat 40 mm×60 mm tool (effective heating area=40 mm×40 mm) was additively manufactured using both non-conductive and conductive materials. Two copper electrodes were attached to the tooling using a conductive adhesive to allow for connection to the power source (FIG. 1A). The electrothermal performance (i.e., heat-generation capability) of the printed tooling were determined by measuring the temperature distribution of the tooling using an infrared thermal camera as a function of applied electric power (FIGS. 1B and 2B). As shown in FIGS. 1B and 2B, a uniform heat distribution is observed within the tooling.

The new multimaterial printing approach was also used to additively manufacture a non-flat tool (FIGS. 2A and 2B) to demonstrate the ability to fabricate self-heated tooling with complex geometries.

To demonstrate composite fabrication using self-heated tooling, a 3D-printed flat tool was used to cure a composite panel (40 mm×40 mm) via conventional vacuum-bagging of an out-of-autoclave carbon fiber/epoxy prepreg system (FIGS. 5A and 5B). Upon preparation of the layup and applying vacuum, electric current was applied to the tooling to heat it up at 80° C. for four hours and cure the composite material according to the manufacture's recommended cure cycle. The resulting composite panel was fully cured (degree of cure=98.6% determined from differential scanning calorimetry, DSC, measurement), indicating the effective and successful heating and curing of composite materials using the 3D-printed self-heated tool.

A number of example implementations are provided herein. However, it is understood that various modifications can be made without departing from the spirit and scope of the disclosure herein. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. Although the terms "comprising" and "including" have been used herein to describe various implementations, the terms "consisting essentially of" and "consisting of" can be used in place of "comprising" and "including" to provide for more specific implementations and are also disclosed.

Disclosed are materials, systems, devices, methods, compositions, and components that can be used for, can be used in conjunction with, can be used in preparation for, or are products of the disclosed methods, systems, and devices. These and other components are disclosed herein, and it is understood that when combinations, subsets, interactions, groups, etc. of these components are disclosed that while specific reference of each various individual and collective combinations and permutations of these components may not be explicitly disclosed, each is specifically contemplated and described herein. For example, if a device is disclosed and discussed each and every combination and permutation of the device are disclosed herein, and the modifications that are possible are specifically contemplated unless specifically indicated to the contrary. Likewise, any subset or combination of these is also specifically contemplated and disclosed. This concept applies to all aspects of this disclosure including, but not limited to, steps in methods using the disclosed systems or devices. Thus, if there are a variety of additional steps that can be performed, it is understood that each of these additional steps can be performed with any specific method steps or combination of method steps of the disclosed methods, and that each such combination or subset of combinations is specifically contemplated and should be considered disclosed.

What is claimed is:

1. A method of manufacturing a self-heating device and a polymer part using the self-heating tooling device, the method comprising:
   providing an electrically insulative layer, wherein the insulative layer has a first surface and a second surface spaced apart from the first surface;
   disposing an electrically conductive layer onto the insulative layer, wherein the conductive layer has a first surface and a second surface spaced apart from the first surface, wherein the second surface of the conductive layer is coupled to the first surface of the insulative layer, wherein the conductive layer comprises a polymer, wherein conductive nanoparticles are embedded in the polymer, wherein the conductive layer produces heat through Joule heating when electrical current is passed through the conductive layer;
   directly coupling a first electrode and a second electrode to the conductive layer, wherein the first electrode and the second electrode are spaced apart from each other and in electrical communication with each other through the conductive layer;
   after the conductive layer has cured, disposing a composite resin adjacent the first surface of the cured conductive layer; and
   causing the cured conductive layer to produce heat through Joule heating to cure the composite resin into a separable polymer composite part.

2. The method of claim 1, further comprising providing a build plate, wherein the insulative layer is disposed onto the build plate.

3. The method of claim 2, wherein the insulative layer is disposed onto the build plate by additive manufacturing.

4. The method of claim 1, wherein the conductive layer is disposed onto the insulative layer by additive manufacturing.

5. The method of claim 1, wherein the polymer comprising the conductive layer is a first polymer, wherein the insulative layer comprises a second polymer, wherein the method further comprises causing the insulative layer to cure.

6. The method of claim 5, wherein the first polymer and the second polymer are the same material.

7. The method of claim 6, wherein the insulative layer is caused to cure before the conductive layer is disposed onto the insulative layer.

8. The method of claim 1, wherein the first electrode and the second electrode are coupled to the conductive layer after the conductive layer is caused to cure.

9. The method of claim 1, wherein the nanoparticles comprise carbon.

10. The method of claim 1, wherein the polymer is polydicyclopentadiene (PDCPD).

11. The method of claim 1, wherein the insulative layer is a first insulative layer, wherein the method further comprises disposing a second insulative layer onto the conductive layer such that the second insulative layer is coupled to the first surface of the conductive layer.

12. The method of claim 11, wherein the second insulative layer is disposed onto the conductive layer by additive manufacturing.

13. The method of claim 1, wherein the first electrode and the second electrode are directly coupled to the conductive layer by a conductive adhesive.

14. The method of claim 1, further comprising removing the polymer composite part from the conductive layer.

15. The method of claim 1, wherein the cured conductive layer and the insulative layer are thermally stable such that causing the cured conductive layer to produce heat through Joule heating to cure the composite resin into a separable polymer composite part does not create a difference in thermal expansion between the cured conductive layer and the insulative layer.

16. A method of manufacturing a polymer part using a self-heating tooling device, the method comprising:
   providing the self-heating tooling device, the device comprising:
      an electrically insulative layer having a first surface and a second surface spaced apart from the first surface;
      an electrically conductive layer having a first surface and a second surface spaced apart from the first surface, wherein the second surface of the conductive layer is coupled to the first surface of the insulative layer, wherein the conductive layer comprises a polymer, wherein conductive nanoparticles are embedded in the polymer; and a first electrode and a second electrode directly coupled to the conductive layer, wherein the first electrode and the second electrode are spaced apart from each other and in electrical communication with each other through the conductive layer;

disposing a layer of resin onto the device and adjacent the first surface of the conductive layer such that the layer of resin is in thermal communication with the conductive layer; and causing electrical current to flow through the conductive layer to produce heat through Joule heating to cause the layer of resin cure into a polymer part.

17. The method of claim 16, wherein the layer of resin further comprises fibers and the polymer part is a fiber-reinforced polymer composite.

18. The method of claim 16, wherein disposing a layer of resin comprises additive manufacturing.

19. The method of claim 16, wherein the nanoparticles comprise carbon.

20. The method of claim 16, wherein the polymer is polydicyclopentadiene (PDCPD).

21. The method of claim 16, wherein the polymer comprising the conductive layer is a first polymer, wherein the insulative layer comprises a second polymer.

22. The method of claim 21, wherein the first polymer and the second polymer are the same material.

23. The method of claim 16, wherein the layer of resin is disposed onto the first surface of the conductive layer.

24. The method of claim 16, wherein the insulative layer is a first insulative layer, wherein the device further comprises a second insulative layer coupled to first surface of the conductive layer, wherein the layer of resin is disposed onto the second insulative layer.

25. The method of claim 16, wherein the first electrode and the second electrode are directly coupled to the conductive layer by a conductive adhesive.

* * * * *